United States Patent
Li

(10) Patent No.: US 8,841,888 B2
(45) Date of Patent: Sep. 23, 2014

(54) INDIVIDUAL CELL VOLTAGE DETECTION CIRCUIT FOR CHARGE AND DISCHARGE CONTROL IN A BATTERY PACK

(75) Inventor: Guoxing Li, Sunnyvale, CA (US)

(73) Assignee: 02Micro, Inc., Santa Clra, CA (US)

( * ) Notice: Subject to any disclaimer, the term of this patent is extended or adjusted under 35 U.S.C. 154(b) by 179 days.

(21) Appl. No.: 13/162,448

(22) Filed: Jun. 16, 2011

(65) Prior Publication Data

US 2012/0319654 A1  Dec. 20, 2012

(51) Int. Cl.
- *H02J 7/00* (2006.01)
- *H02J 7/04* (2006.01)
- *H02J 7/16* (2006.01)
- *H01M 10/44* (2006.01)
- *H01M 10/48* (2006.01)
- *H01M 10/42* (2006.01)

(52) U.S. Cl.
CPC .............. *H01M 10/441* (2013.01); *Y02E 60/12* (2013.01); *H01M 2010/4271* (2013.01); *H02J 7/0031* (2013.01); *H01M 10/482* (2013.01); *H02J 7/0021* (2013.01)
USPC .......................................... 320/162; 320/118

(58) Field of Classification Search
USPC .................. 320/118, 152, 132, 134–136, 162
See application file for complete search history.

(56) References Cited

U.S. PATENT DOCUMENTS

| | | | |
|---|---|---|---|
| 4,599,578 A * | 7/1986 | Seevinck | 330/298 |
| 5,367,248 A * | 11/1994 | Lin | 323/312 |
| 6,489,749 B1 | 12/2002 | Nakashimo et al. | |
| 7,564,217 B2 * | 7/2009 | Tanigawa et al. | 320/118 |
| 7,741,811 B2 * | 6/2010 | Daio | 320/122 |
| 8,154,253 B2 * | 4/2012 | Omagari | 320/134 |
| 8,253,383 B2 | 8/2012 | Li | |
| 8,264,200 B2 * | 9/2012 | Lum-Shue-Chan et al. | 320/116 |
| 2005/0073282 A1 | 4/2005 | Carrier et al. | |
| 2006/0097695 A1 * | 5/2006 | Chen et al. | 320/114 |
| 2008/0297963 A1 * | 12/2008 | Lee et al. | 361/87 |
| 2009/0091332 A1 * | 4/2009 | Emori et al. | 324/537 |
| 2010/0289497 A1 * | 11/2010 | Lum-Shue-Chan et al. | 324/426 |
| 2011/0062917 A1 * | 3/2011 | Shiu et al. | 320/118 |

FOREIGN PATENT DOCUMENTS

| | | |
|---|---|---|
| CN | 2922241 Y | 7/2007 |
| CN | 101416330 A | 4/2009 |
| TW | 521467 B | 2/2003 |
| TW | 200527793 A | 8/2005 |
| TW | 201033631 A | 9/2010 |

\* cited by examiner

*Primary Examiner* — Richard V Muralidar
*Assistant Examiner* — David Henze-Gongola

(57) ABSTRACT

A battery management system for a battery pack comprises a battery module and a controller. The controller comprises a voltage detection and control circuit, wherein the controller comprises a voltage to current converter. A cell voltage is converted to current and produces a voltage detected at an input to one or more logic devices. The level of voltage detected is dependent upon the current output of the voltage to current converter and a threshold current. The output of the one or more logic devices is received by a controller, and the controller is operable to control the charging and discharging of the battery cell based on the logic device output.

20 Claims, 6 Drawing Sheets

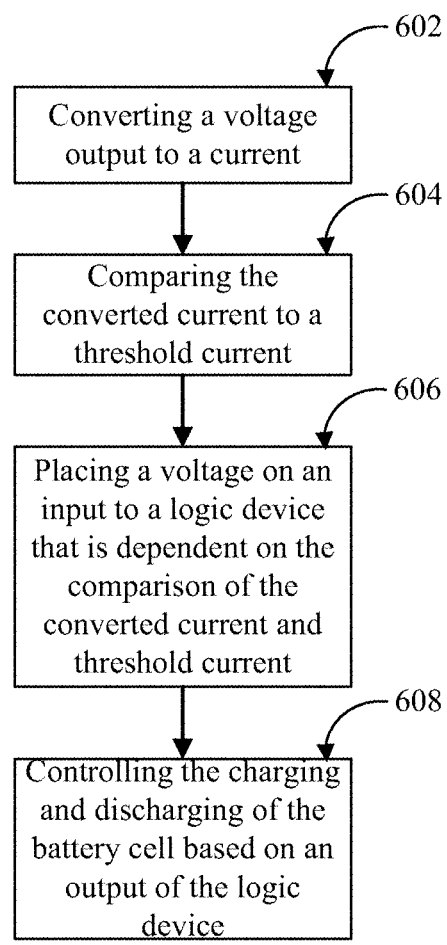

US 8,841,888 B2

INDIVIDUAL CELL VOLTAGE DETECTION CIRCUIT FOR CHARGE AND DISCHARGE CONTROL IN A BATTERY PACK

TECHNICAL FIELD

The present disclosure relates generally to the field of rechargeable batteries and more specifically to the field of battery cell voltage detection for battery cell charging and discharging control.

BACKGROUND

During the past few decades, there has been an increasing interest in electronic devices, such as power supplies for various applications. The increasing demand for power supplies has resulted in the continuous development of battery packs, e.g., rechargeable battery packs.

A battery pack can consist of multiple battery cells coupled in series. When one of the battery cells is damaged, the lifetime of the battery pack will be shortened. An unbalance between any two of the battery cells can lead to a reduction in battery lifetime. FIG. 1 illustrates a block diagram of a conventional lead-acid battery pack 100. The lead-acid battery pack 100 is generally employed in low cost applications due to its simple structure. Other battery packs can also utilize lithium ion (Li-ion) batteries.

The battery pack 100 can include multiple battery modules 101-104 coupled in series. Each of the battery modules 101-104 can also consist of six battery cells 111-116 and two electrodes 120 and 129.

Each battery cell in a battery pack needs to have its cell voltage individually monitored. Such monitoring can allow for precise battery cell charging and discharge control. Such monitoring protects battery cells from being charged or discharged when their current voltage level is "over-voltage" (OV) or "under-voltage" (UV). When the voltage of a battery cell, especially lithium ion (Li-ion) battery cells, gets too low, there can potentially be issues, such as internal shorting. Therefore, when the voltage level of a battery cell gets too low, ideally charge/discharge control circuitry will prevent any further charging or discharging. Also, if the voltage output of a battery cells gets too high, further charging of the over-voltage cell should be stopped to prevent the over-voltage cells from suffering damage or burning.

Conventional methods use either complicated voltage translators with op-amps and a voltage sense resistor or in the alternative, by making direct use of a metal-oxide-semiconductor (MOS) field-effect transistor's threshold voltage to check if a battery cell's voltage is too low. Such conventional methods may have a high cost and/or may result in increased power consumption. The conventional methods may also be too simple to meet design requirements. Further, when a MOS threshold voltage is used to check an individual battery cell's voltage output, the MOS threshold voltage is not flexible enough to meet differing requirements. Additionally, the MOS threshold voltage can also vary with process variation and with temperature variation, etc.

SUMMARY OF THE INVENTION

This present invention provides a solution to the challenges inherent in individual battery cell voltage detection for battery cell charging and discharging control. Embodiments of the present disclosure can provide battery cell voltage detection for battery charging and discharging control that provides a flexible yet precisely controlled threshold level that is not sensitive to process variations or temperature shifts.

In an apparatus according to one embodiment of the disclosure, a voltage detection and control circuit comprises a voltage to current converter. A cell voltage is converted to current and produces a voltage detected at an input to one or more logic devices, wherein the level of voltage detected is dependent upon the current output of the voltage to current converter and a threshold current, wherein the output of the one or more logic devices is received by a controller, and wherein the controller is operable to control the charging and discharging of the battery cell based on the logic device output.

In a method according to another embodiment of the disclosure, a charging and discharging of a battery cell is controlled by detecting a voltage output of the battery cell. The method begins by converting the voltage output of the battery cell to a current. The converted current is compared to a threshold current, wherein a voltage detected at a logic device is dependent upon the compared converted current and threshold current. Lastly the charging and discharging of the battery cell is controlled in response to the output of the logic device.

BRIEF DESCRIPTION OF THE DRAWINGS

The present invention will be better understood from a reading of the following detailed description, taken in conjunction with the accompanying drawing figures in which like reference characters designate like elements and in which:

FIG. 6 illustrates a flow diagram, illustrating the steps to a method in accordance with an embodiment of the present invention.

DETAILED DESCRIPTION

Figure 1:
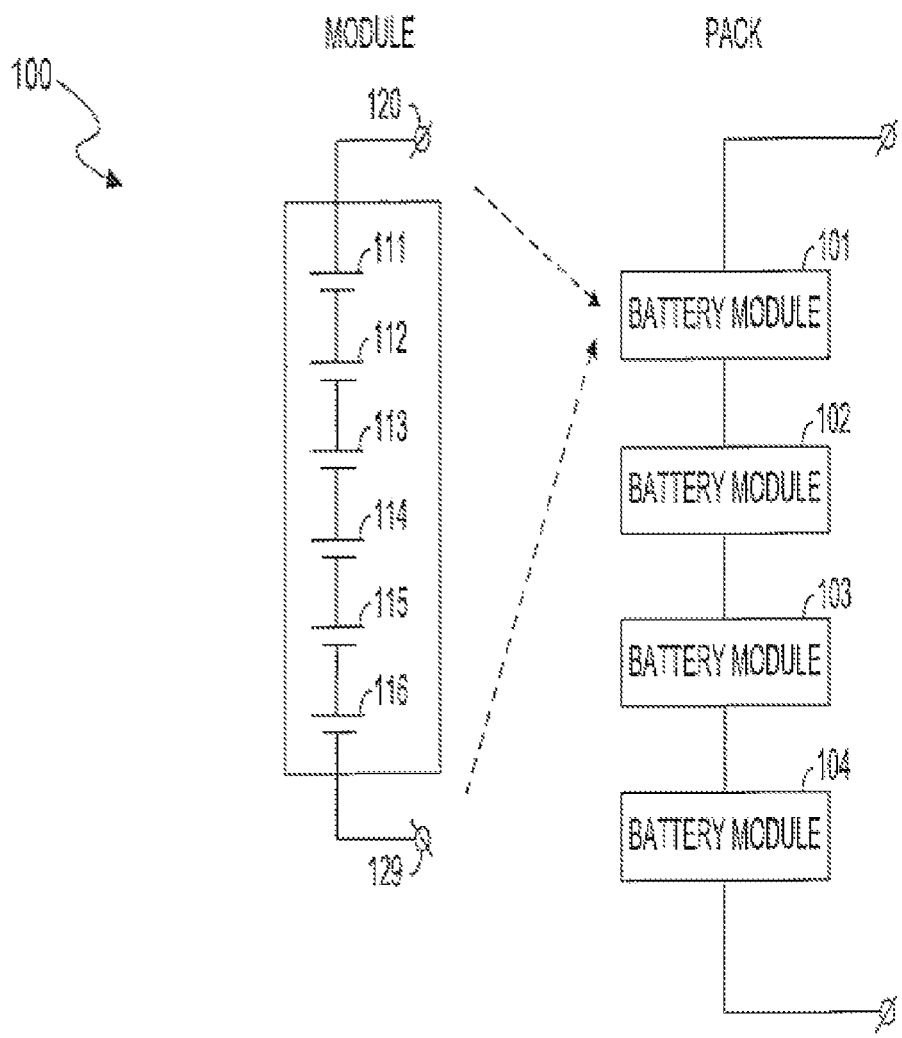
FIG. 1 illustrates a simplified block diagram of a conventional battery pack.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

This present invention provides a solution to the challenges inherent in individual battery cell voltage detection for battery cell charging and discharging control. Various embodiments of the present disclosure can provide battery cell voltage detection for battery charging and discharging control. As discussed below, such detection and control provides a flexible yet precisely controlled threshold level that is not sensitive to process variation or temperature shift.

A conventional method of low voltage detection is to compare each individual battery cell's voltage output to a predefined voltage reference. If the battery cell voltage is lower than a threshold, a logic signal can be generated to prevent any further charging or discharging. This type of method or process requires additional power consumption, and when the target cell voltage is already low, the reference voltage may be incorrect or the comparator may not work well and thus lose control.

Figure 2:
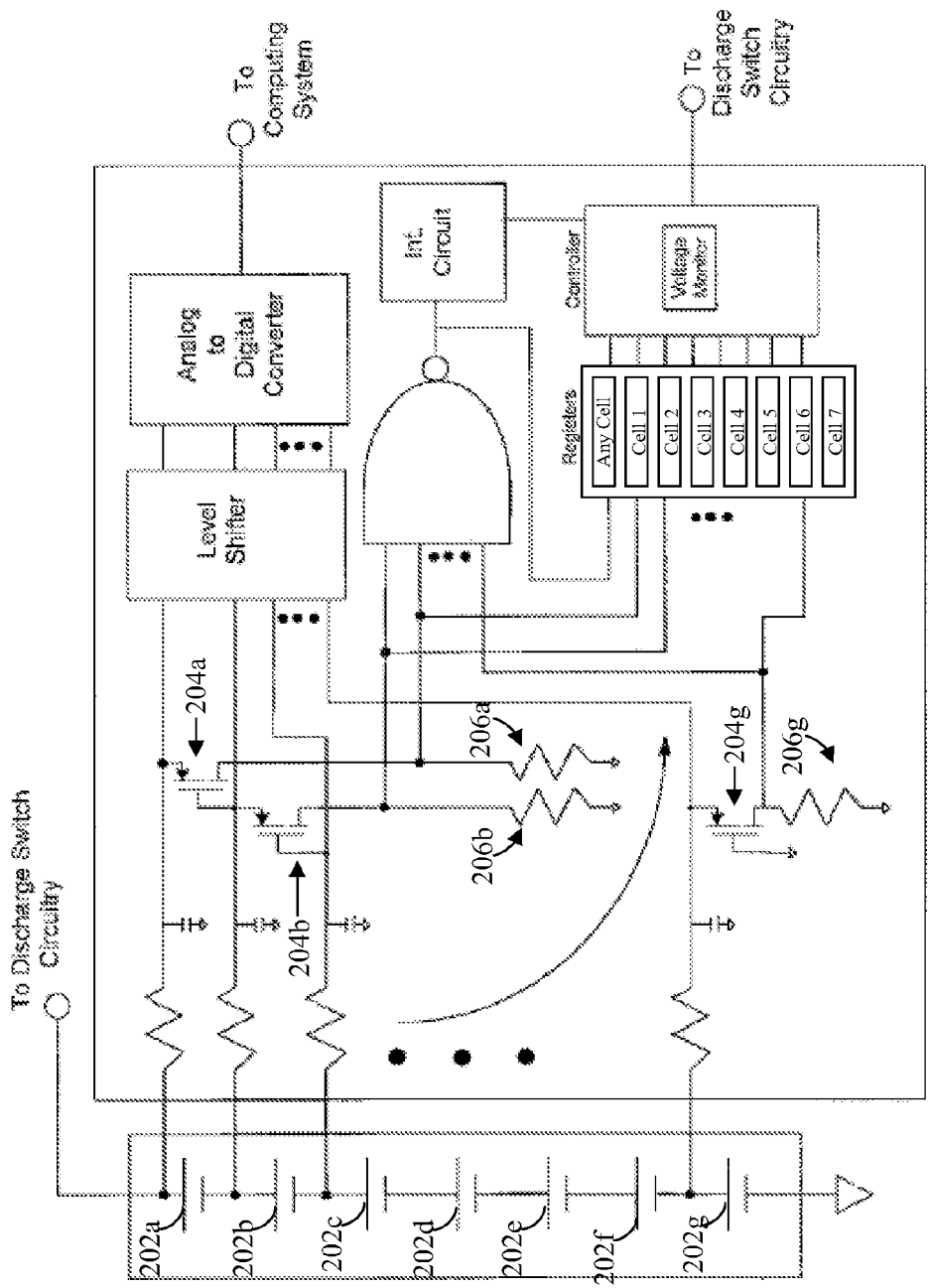
FIG. 2 illustrates a simplified block diagram of a conventional battery cell voltage detection and discharge control circuit.

Another method is to use a MOS transistor threshold voltage as a battery cell low-voltage threshold. When any battery cell voltage is less than the MOS transistor threshold voltage, it will be reported as a low voltage. As illustrated in FIG. 2, when the voltage of a battery cell, such as battery cell 202a, is less than the threshold of PMOS transistor 204a, the voltage drop of resistor 206a will be zero and a low voltage control signal will be generated.

Figure 3:
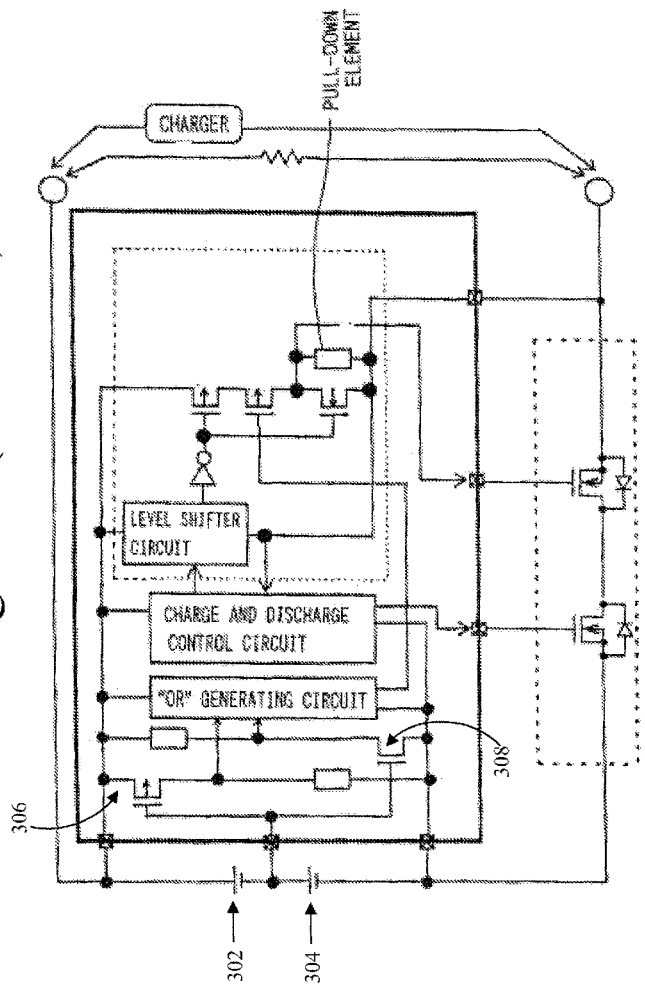
FIG. 3 illustrates another simplified block diagram of a conventional battery cell voltage detection and charge control circuit.

Similarly, as illustrated in FIG. 3, when the voltage of a battery cell, such as battery cell 302, is less than the threshold voltage of PMOS transistor 306 or the voltage of battery cell 304 is less than the threshold voltage of NMOS transistor 308, the voltage detection and control circuitry of FIG. 3 will report a battery cell low voltage condition and prevent further charging or discharging of the low-voltage battery cell.

Using either of these methods can have several drawbacks. Because the MOS transistor's threshold voltage is fixed and determined by the process, it may not meet the requirements of low-voltage charging and discharging protection. Additionally, MOS transistor threshold voltages can change with temperature change. Lastly, a very large pull-up/pull-down resistor is needed in order to control power consumption when a battery cell voltage is higher than the MOS transistor's threshold voltage.

An exemplary embodiment consists of a voltage to current converter unit (V/I unit) and a current source used as a threshold for each cell from the pack. Based on the MOSFET active region drain current equation, the output current of the V/I unit can be give below for a given cell voltage input:

$$I_{MP} = \frac{V_{CELL} - V_{TP}}{R_S} + \frac{1}{2KR_S^2}\left(1 + \sqrt{1 + 4KR_S(V_{CELL} - V_{TP})}\right). \quad \text{(Equation 1)}$$

In this equation, $V_{TP}$ is the PMOS threshold and $K=\mu_P C_{OX}(W/L)/2$ is a constant number determined by process parameters and transistor size (width/length). It can be seen that the output current will increase monotonically with the cell voltage. When the $R_S$ value is sufficiently large enough, the second portion of the above equation $$\left(\text{i.e., } \frac{1}{2KR_S^2}\left(1 + \sqrt{1 + 4KR_S(V_{CELL} - V_{TP})}\right)\right)$$

can be ignored and thus the V/I output current can be linearly proportional to the cell input voltage $$\left(\text{i.e., } I_{MP} = \frac{V_{CELL} - V_{TP}}{R_S}\right).$$

If a predefined current source $I_{TH}$ is given, the corresponding voltage threshold can be obtained:

$$V_{TH} = I_{TH} R_S + \sqrt{\frac{I_{TH}}{K}} + V_{TP}. \quad \text{(Equation 2)}$$

Where $V_{TH}$ is a charging or discharging permission voltage threshold, $I_{TH}$ is the predefined charging/discharging permission current source threshold.

It can be seen that once the resistor $R_S$ is designed and the size of the PMOS transistor is fixed, the charging/permission threshold may be determined by the predefined current threshold $I_{TH}$.

Figure 4:
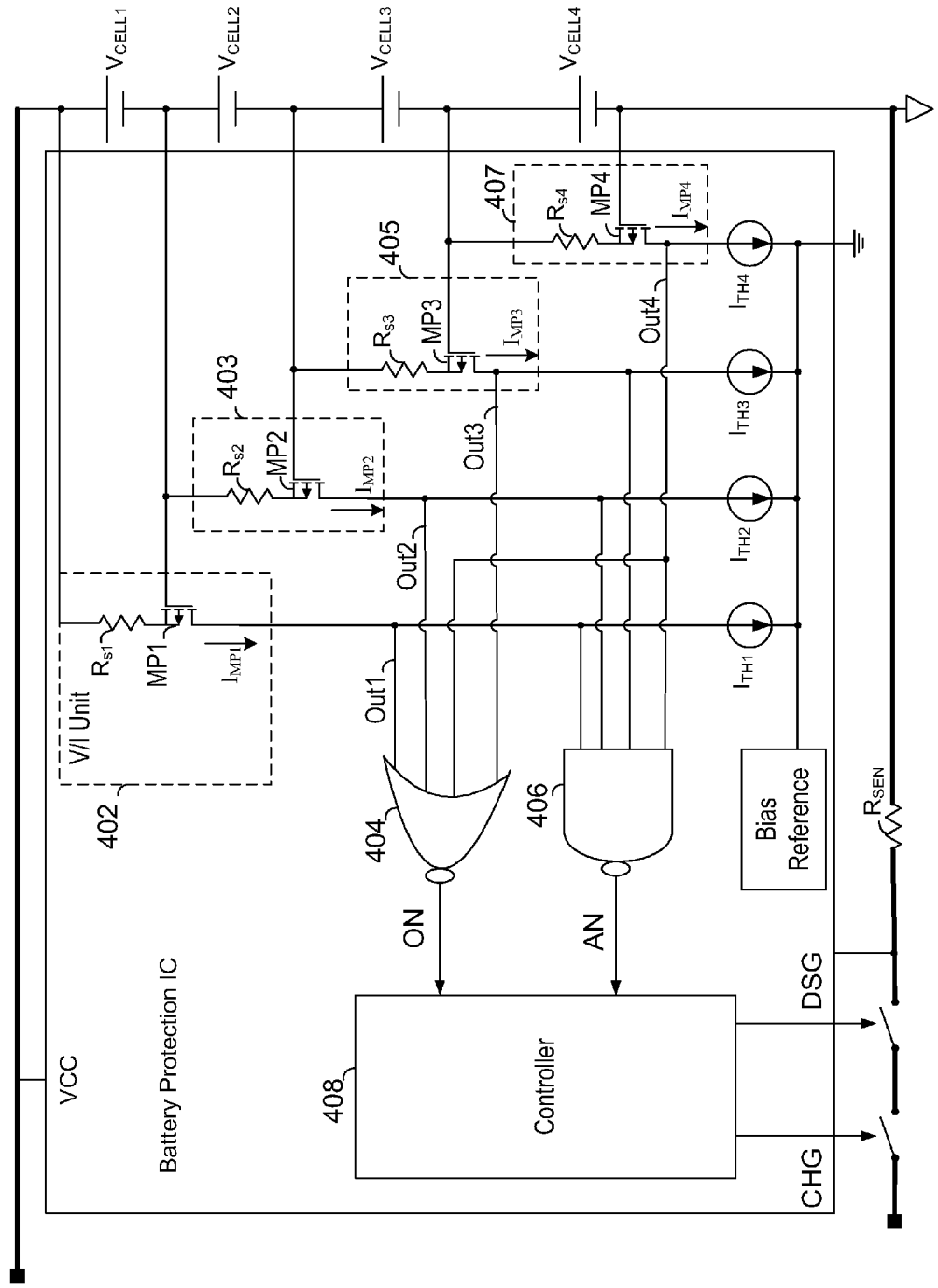
FIG. 4 illustrates a simplified block diagram of a battery cell voltage detection circuit with battery discharge and charge control circuitry in accordance with an embodiment of the present invention.

As illustrated in FIG. 4, each of the voltage to current converters (402, 403, 405 and 407) is connected across each cell (Cell1-Cell 4), and operates across the voltage of the associated cell. In one embodiment, the voltage to current converters 402, 403, 405 and 407 are identical, so the detailed description will focus on the voltage to current converter 402 illustrated in FIG. 4. In one embodiment, the voltage to current converter 402 includes a resistor Rs1 and a PMOS transistor MP1. In one embodiment, when a battery cell's (Cell1-Cell4) voltage output is sufficiently high enough that the associated voltage to current converter's current output ($I_{MP1}$ through $I_{MP4}$) is greater than an associated predetermined threshold current ($I_{TH1}$ through $I_{TH4}$), the corresponding node (Out1-Out4) connected to the inputs of a logic device 404, 406 will see a voltage drop increase at the node to a "high" level. In an exemplary embodiment, a "high" voltage level input to a logical device resulting in logic 1 may be between 3-5 V. As further illustrated in FIG. 4, and discussed below, when a battery cell's (Cell1-Cell4) voltage output is sufficiently low enough that the associated voltage to current converter's current output ($I_{MP1}$ through $I_{MP4}$) is less than the associated predetermined threshold current ($I_{TH1}$ through $I_{TH4}$), the corresponding node (Out1-Out4) connected to the inputs of the logic device 404, 406 will see a voltage drop decrease at the node to a "low" level. In an exemplary embodiment, a "low" voltage level input to a logical device resulting in logic 0 may be between 0-2 V. As discussed below, the threshold currents $I_{TH1}$ through $I_{TH4}$ are identical, and can be selected for a particular current value such as an exemplary over-voltage threshold current, an exemplary under-voltage threshold current, and an exemplary charging permission threshold current.

For example, as illustrated in FIG. 4, when any battery cell's (Cell1-Cell4) voltage output is sufficiently high enough that the associated voltage to current converter's current output ($I_{MP1}$ through $I_{MP4}$) is greater than an exemplary, predetermined over-voltage threshold current ($I_{OV\_TH}$), the corresponding node (Out1-Out4) connected to the inputs of a NOR gate 404 and a NAND gate 406 will see a voltage drop increase to a "high" level. Such a high level at that node (Out1-Out4) will place a "high" signal on an input to the NOR gate 404, resulting in a "low" signal output from the NOR gate 404. Once a controller 408 receives this "low" signal (i.e., logic 0) from the NOR gate 404, the controller 408 can cease a currently running charging cycle on the battery cells (Cell1-Cell4) by turning off the CHG switch. By switching off the charging circuit when one of the battery cell's (Cell1-Cell4) voltage outputs passes an over-voltage threshold, the charging system is prevented from creating a possible over-voltage event. In a further embodiment, the controller 408 can utilize a timed delay before switching off (through switch CHG) the charging circuit. Such a delay can allow the controller 408 to verify that the over-voltage measured is a true condition and not just a transient voltage spike, or temporary voltage increase.

As illustrated in FIG. 4, the controller 408 can also be used to initiate a charging cycle by comparing the output of each voltage to current converter's (e.g., 402, 403, 405 and 407) to a threshold current set as a charging permission threshold current ($I_{CP\_TH}$). When all battery cells (Cell1-Cell4) have a voltage output that is sufficiently high enough that each voltage to current converter's current output ($I_{MP1}$ through $I_{MP4}$) is greater than a predetermined charging permission threshold current ($I_{CP\_TH}$), each of the corresponding nodes (Out1-Out4) will see a voltage drop increase to a "high" level. Such high levels at nodes Out1-Out4 will place a "high" signal on each of the inputs to the NOR gate 404 and the NAND gate 406. Such a "high" signal on all of the inputs to the NAND gate 406 will result in a "low" signal output from the NAND gate 406. Therefore, only when all of the battery cell (Cell1-Cell4) voltages are above a charging permission threshold voltage will the controller 408 receive a "low" signal from the NAND gate 406 and allow the beginning of a charging cycle by turning on the CHG switch. Such a charging permission routine will prevent the charging of a damaged or "dead" battery cell that is showing an abnormally low voltage output. In a further embodiment, the controller 408 can utilize a timed delay before switching on (through switch CHG) the charging circuit. Such a delay can allow the controller 408 to verify that the voltage output measured is a true condition and not just a transient voltage spike, or temporary voltage increase.

As further illustrated in FIG. 4, the controller 408 can also be used to control a discharging cycle of the battery cells (Cell1-Cell4) by comparing the output of each voltage to current converter's to a threshold current set as an under-voltage threshold current ($I_{UV\_TH}$). When all battery cells (Cell1-Cell4) have a voltage output that is sufficiently high enough that each voltage to current converter's current output ($I_{MP1}$ through $I_{MP4}$) is greater than a predetermined under-voltage threshold current ($I_{UV\_TH}$), each of the corresponding nodes (Out1-Out4) will see a voltage drop that is a "high" level. Such high levels at nodes Out1-Out4 will place a "high" signal at each of the inputs to the NOR gate 404 and the NAND gate 406. Such a "high" signal on all the inputs of the NAND gate 406 will result in a "low" signal output from the NAND gate 406. Therefore, only when all the battery cell voltages are above the under-voltage threshold will the controller 408 receive a "low" signal from the NAND gate 406 and allow a currently running discharging cycle to continue by allowing the DSG switch to remain on. In other words, the discharging circuit will be disconnected, discontinuing the currently running discharge cycle when any of the battery cells (Cell1-Cell4) has a voltage output that has dropped below an under-voltage threshold. Such a voltage output (under-volt) can be achieved either through the proper discharging of the battery cell during the discharge cycle, or because of a defect in the battery cell, either way, the discharge cycle will be discontinued.

As discussed above, while a voltage output above the under-volt threshold for all the battery cells (Cell1-Cell4) will allow the discharging cycle to continue, only a single battery cell having a voltage output below the under-volt threshold will shut off the discharging cycle. For example, when any battery cell's (Cell1-Cell4) voltage output is sufficiently low enough that the associated voltage to current converter's current output ($I_{MP1}$ through $I_{MP4}$) is less than the predetermined under-voltage threshold current ($I_{UV\_TH}$), the corresponding node (Out1-Out4) will see a voltage drop decrease to a "low" level. Such a low level at node Out1-Out4 will place a "low" signal on an input to the NOR gate 404 and the NAND gate 406. The placing of a "low" signal at the input of the NAND gate 406 will result in a "high" signal output from the NAND gate 406. Therefore, when any of the battery cell (Cell1-Cell4) voltages drop to a level below the under-voltage threshold, the controller 408 will receive a "high" signal from the NAND gate 406 and stop the currently running discharging cycle by turning off the DSG switch. In a further embodiment, the controller 408 can also utilize a timed delay before switching off (through switch DSG) the discharging circuit. Such a delay can allow the controller 408 to verify that the under-voltage condition measured is a true condition and not just a transient voltage drop, or temporary voltage decrease.

Figure 5:
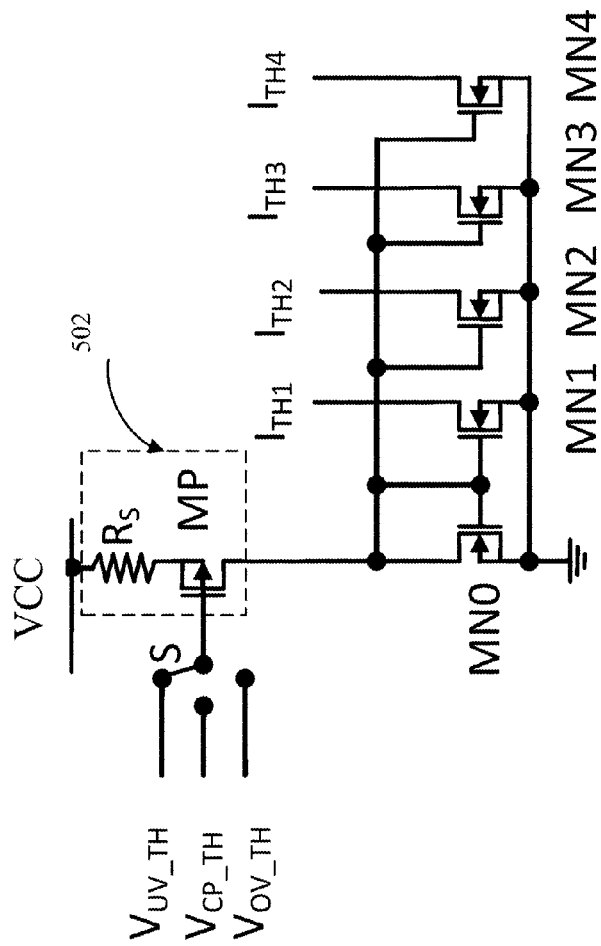
FIG. 5 illustrates a portion of a simplified block diagram of a battery cell voltage detection circuit with variable voltage threshold in accordance with an embodiment of the present invention.

In one embodiment the threshold currents $I_{TH1}$ through $I_{TH4}$ of all the cells can be generated from the current mirrors associated with predefined source current $I_S$. One way to generate the source current is illustrated in FIG. 5. As illustrated in FIG. 5, a PMOS transistor MP has the same type and same dimension with those PMOS transistors in the voltage to current converters (V/I units) in FIG. 4, e.g., V/I units 402, 403, 405, and 407, and they are matched with each other. The resistor $R_S$ in FIG. 5 also has the same dimension with those in V/I units in FIG. 4, e.g., V/I units 402, 403, 405, and 407, and they are matched with each other. NMOS transistors MN0-MN4 consist of current mirrors and have a unit ratio. In practical design, an exemplary cascode current mirror could be used to improve its output impedance so that the output voltage would not affect the current mirror performance.

As illustrated in FIG. 5, a selectable reference voltage can be applied to the voltage to current converter 502 such that a selectable threshold current ($I_{TH1}$ through $I_{TH4}$) is possible. For example, when the switch S is connected with reference $V_{UV\_TH}$ which is relative to VCC, the output current from the current mirrors will be $I_{UV\_TH}$. The controller 408 of FIG. 4 can still be used to perform the above describe under-voltage detection. Since the voltage to current converter (402, 403, 405 and 407 in FIG. 4) and voltage to current converter 502 can use the same circuitry and are matched with each other, the battery cell under-voltage threshold current will be completely determined by $V_{UV\_TH}$ and independent of the value of resistor $R_S$ and any PMOS transistor variation. The only requirement is the above noted matching properties. Therefore, this topology is not sensitive to process variation and the protection threshold can be well defined.

Similarly when the switch S is connected to $V_{OV\_TH}$, the voltage detection and discharging/charging control circuitry of FIGS. 4 and 5, as described above, can be used to check for over-voltage conditions in all the battery cells (Cell1-Cell4). When the switch S is connected to $V_{CP\_TH}$, the discharging/charging control circuitry of FIGS. 4 and 5, as described above, can be used to check the charging permission for all the battery cells (Cell1-Cell4).

FIG. 6 illustrates the steps to a process for using the detected voltage output of a battery cell to determine the discharge and/or charging control of the battery cell. In step 602 of FIG. 6, a voltage output of a battery cell is converted to a current. As discussed above, the conversion can be performed with a voltage to current converter.

In step 604 of FIG. 6, the converted current is compared to a threshold current. In one embodiment the threshold current corresponds to a charging permission threshold. In another embodiment the threshold current corresponds to an over-voltage threshold. While in another embodiment the threshold current corresponds to an under-voltage threshold. In yet another embodiment, the threshold current can be varied to select a threshold current comprising one of a charging permission threshold, an over-voltage threshold, and an under-voltage threshold.

In step 606 of FIG. 6 a voltage is placed at an input to a logic device. The input voltage to the logic device is dependent upon the comparison of the converted current and the threshold current. As illustrated above, when the converted current is greater than the threshold current, an input voltage of the logic device will be a "high" input signal. In one embodiment the logic device may be a NAND gate and/or a NOR gate.

In step 608 of FIG. 6 the charging and discharging of the battery cell is controlled, based upon an output of the logic device.

Embodiments of the battery cell voltage output detection circuits for charge and discharge control have the following advantages.

1. The use of a voltage to current converter and predetermined threshold current allow for flexibility in detecting multiple threshold levels, such as over-voltage conditions, under-voltage conditions, and charging permission conditions.
2. Each of the above protection thresholds can be precisely controlled. As discussed above, conventional protection thresholds were determined by a MOS transistor threshold voltage level.
3. Lastly, the embodiments as disclosed above are not sensitive to process variation. Such may not be the case with conventional systems that use a MOS transistor threshold voltage level, as the MOS transistor threshold voltage can vary with temperature, process variation, and so on.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A battery management system for a battery pack comprising:
    a battery module comprising a plurality of battery cells;
    a first voltage to current converter, coupled to a battery cell of the plurality of battery cells, configured to generate a current output according to a voltage of the battery cell;
    a current source coupled to the first voltage to current converter, wherein the current source comprises a second voltage to current converter operable for generating a threshold current according to a reference voltage, and the current source is operable for outputting a signal dependent upon a comparison of the current output and the threshold current, and wherein the first voltage to current converter and the second voltage to current converter have the same circuitry and are matched with each other;
    one or more logic devices, coupled to the current source, operable for generating an output according to the signal from the current source; and
    a controller, coupled to the one or more logic devices, operable to control at least one of the charging and discharging of the battery module based upon the output of the one or more logic devices.

2. The battery management system for a battery pack of claim 1, wherein a plurality of input voltages are received by the one or more logic devices, and wherein the plurality of input voltages are each dependent upon the threshold current and a corresponding current output for a voltage output for each of the plurality of battery cells.

3. The battery management system for a battery pack of claim 1, wherein the first voltage to current converter comprises a first metal-oxide-semiconductor field-effect transistor (MOSFET) and a first resistor, wherein the second voltage to current converter comprises a second metal-oxide-semiconductor field-effect transistor (MOSFET) and a second resistor, and wherein the second MOSFET is the same type and has the same dimension as the first MOSFET, and the second resistor has the same dimension as the first resistor.

4. The battery management system for a battery pack of claim 1, wherein the threshold current is one of an over-voltage threshold, an under-voltage threshold, and a charging permission threshold.

5. The battery management system for a battery pack of claim 3, wherein the reference voltage is provided to the second MOSFET of the second voltage to current converter and is one of an over-voltage threshold voltage, an under-voltage threshold voltage, and a charging permission threshold voltage.

6. The battery management system for a battery pack of claim 3, wherein the reference voltage is provided to the second MOSFET of the second voltage to current converter to generate a plurality of threshold currents.

7. The battery management system for a battery pack of claim 1, wherein the one or more logic devices comprise at least one of a NOR gate and a NAND gate.

8. The battery management system for a battery pack of claim 1, wherein an input to the one or more logic devices is a "high" input signal when the current output of the first voltage to current converter is greater than the threshold current, and is a "low" input signal when the current output of the first voltage to current converter is less than the threshold current.

9. A process for controlling a battery pack, comprising:
converting a voltage output of a battery module to a current by a first voltage to current converter;
generating a threshold current according to a reference voltage by a second voltage to current converter, wherein the first voltage to current converter and the second voltage to current converter have the same circuitry and are matched with each other;
outputting a signal dependent upon a comparison of the converted current and the threshold current;
performing a logical function on the signal dependent upon the comparison of the converted current and the threshold current; and
controlling at least one of a charging and discharging of the battery pack based upon an output of the logical function wherein the outputting comprises:
outputting, at a connection node between the first voltage to current converter and a current source, the signal dependent upon the comparison of the converted current and the threshold current, wherein the current source comprises a first transistor and a second transistor coupled to the first transistor;
receiving, at the first transistor, the converted current from the first voltage to current converter through the connection node; and
receiving, at the second transistor, the threshold current from the second voltage to current converter.

10. The process for controlling the battery pack of claim 9, wherein the battery module comprises a plurality of battery cells.

11. The process for controlling the battery pack of claim 10, wherein the logical function is performed on a plurality of input signals, and wherein the plurality of input signals are each dependent upon a comparison of the threshold current and a corresponding converted current for a voltage output for each of the plurality of battery cells.

12. The process for controlling the battery pack of claim 9, wherein the reference voltage is one of an over-voltage threshold, an under-voltage threshold, and a charging permission threshold.

13. The process for controlling the battery pack of claim 9, further comprising:
selecting the threshold current from the group consisting of an over-voltage threshold current, an under-voltage threshold current, and a charging permission threshold current.

14. The process for controlling the battery pack of claim 9, wherein the logical function comprises at least one of a NOR gate and a NAND gate.

15. The process for controlling the battery pack of claim 9, wherein an input signal to the logical function is a "high" input signal when the converted current is greater than the threshold current, and is a "low" input signal when the converted current is less than the threshold current.

16. The process for controlling the battery pack of claim 9, wherein the first voltage to current converter comprises a first metal-oxide-semiconductor field-effect transistor (MOSFET) and a first resistor, wherein the second voltage to current converter comprises a second metal-oxide-semiconductor field-effect transistor (MOSFET) and a second resistor, and wherein the second MOSFET is the same type and has the same dimension as the first MOSFET, and the second resistor has the same dimension as the first resistor.

17. The process for controlling the battery pack of claim 16, further comprising:
selecting the reference voltage from a group comprising an over-voltage threshold voltage, an under-voltage threshold voltage, and a charging permission threshold voltage;
providing the reference voltage to the second MOSFET of the second voltage to current converter; and
selectively generating the threshold current from one of an over-voltage threshold current, an under-voltage threshold current, and a charging permission threshold current that corresponds to the selected reference voltage.

18. The battery management system for a battery pack of claim 1, wherein the current source is operable for providing, at a connection node between the first voltage to current converter and the current source, the signal dependent upon the comparison of the current output and the threshold current, and wherein the current source comprises:
a first transistor, coupled to the connection node, operable for receiving the current output of the first voltage to current converter through the connection node; and
a second transistor, coupled to the first transistor, operable for receiving the threshold current from the second voltage to current converter.

19. The battery management system for a battery pack of claim 18, wherein the first and second transistors form a current mirror.

20. The process for controlling the battery pack of claim 9, wherein the first and second transistors form a current mirror.

* * * * *